United States Patent [19]

Corso

[11] Patent Number: 4,555,859
[45] Date of Patent: Dec. 3, 1985

[54] VIEWER FOR READING AND/OR DISPLAYING INFORMATION RECORDED ON WRITTEN OR PRINTED TAPE

[76] Inventor: Fausto Corso, Via Galvani 2, Sommacampagna, Italy

[21] Appl. No.: 518,888

[22] Filed: Aug. 1, 1983

[30] Foreign Application Priority Data

Aug. 6, 1982 [IT] Italy .................. 84953 A/82

[51] Int. Cl.$^4$ .................................. G09F 27/00
[52] U.S. Cl. ............................ 40/457; 40/455; 40/471; 40/456; 434/308
[58] Field of Search ............. 40/455, 471, 456, 457; 434/308

[56] References Cited

U.S. PATENT DOCUMENTS

| | | | |
|---|---|---|---|
| 2,993,408 | 7/1961 | Cook | 40/455 |
| 3,034,241 | 5/1962 | Kossor et al. | 40/471 |
| 3,088,996 | 5/1963 | Carter | 40/455 |
| 3,174,241 | 3/1965 | Rohan | 40/471 |
| 3,510,973 | 5/1970 | Mazzocco | 40/471 |
| 4,089,598 | 5/1978 | Meyer | 40/456 |
| 4,110,925 | 9/1978 | Strand et al. | 40/471 |
| 4,180,933 | 1/1980 | Chammah | 40/471 |
| 4,406,626 | 9/1983 | Anderson et al. | 434/308 |

Primary Examiner—Gene Mancene
Assistant Examiner—Wenceslao J. Contreras
Attorney, Agent, or Firm—Guido Modiano; Albert Josif

[57] ABSTRACT

The invention relates to a viewer for reading and/or displaying information recorded on written or printed tape.

The viewer includes a supporting housing formed with two seats for removably accommodating two motor-driven rotatable spools or reels, one of which carries a roll of written or printed tape material, e.g. paper, wound thereon, the other being adapted to rewind the tape as it unwinds from the first reel. The tape winding-/unwinding on/from the reels is controlled by a drive circuitry for operation by the user, e.g. through a pushbutton control. Above the tape portion extending between the two reels, there is arranged a magnifying lens for reading the information on the tape. Advantageously, the reel-accommodating seats are located on a drawer structure, which facilitates removal and replacement of the reels.

The viewer may be connected to a recorder to create an audio-visual didactic aid therewith.

10 Claims, 9 Drawing Figures

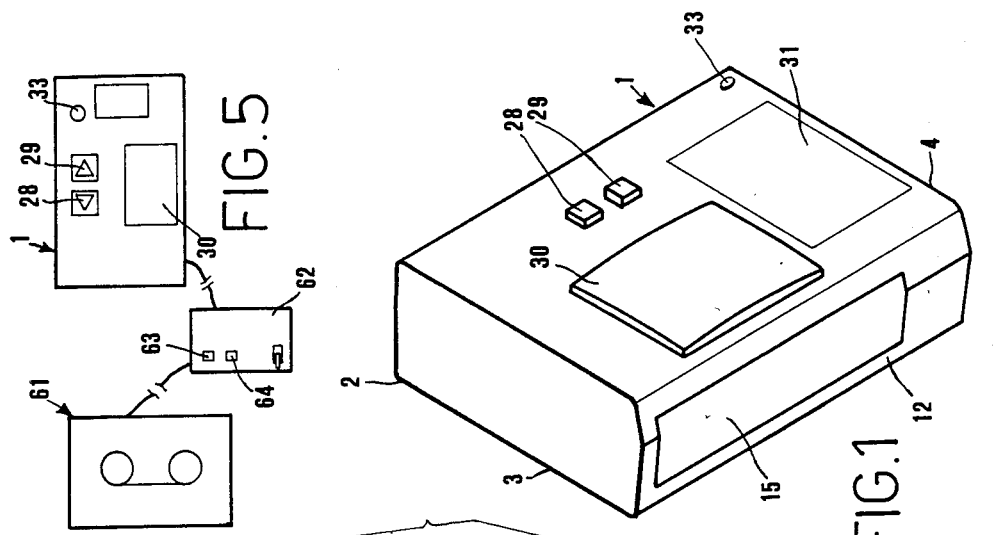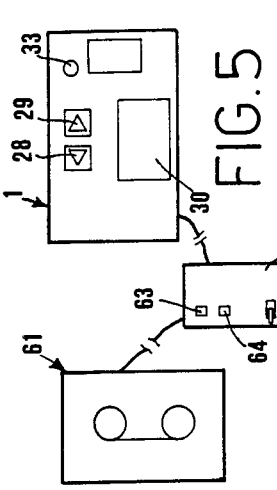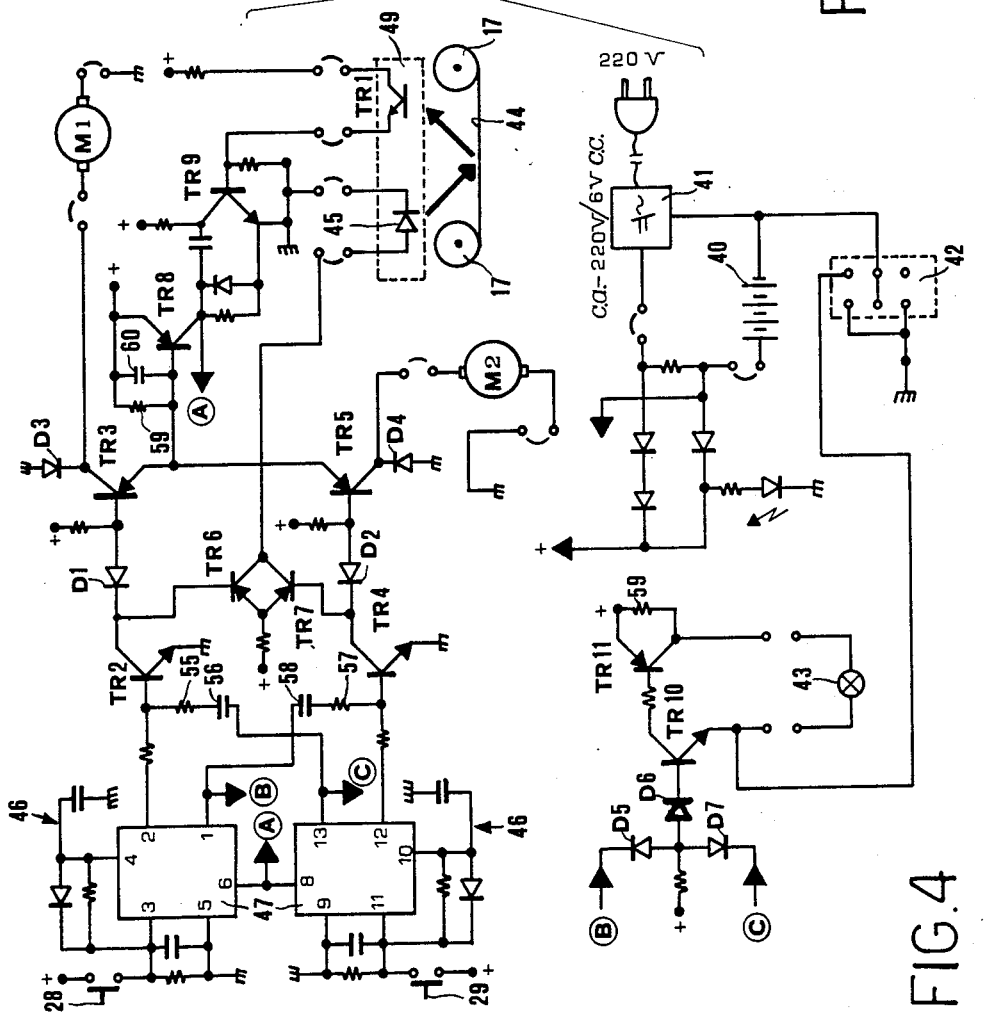

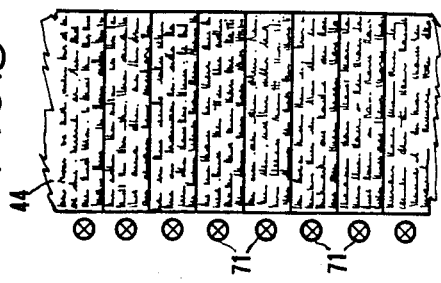
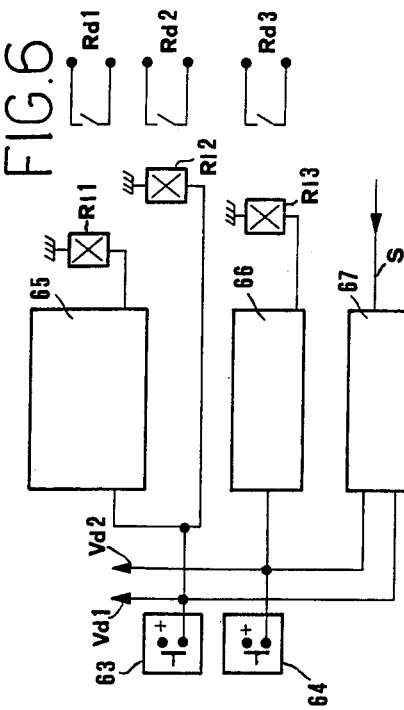
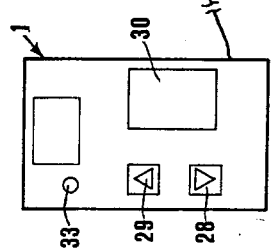
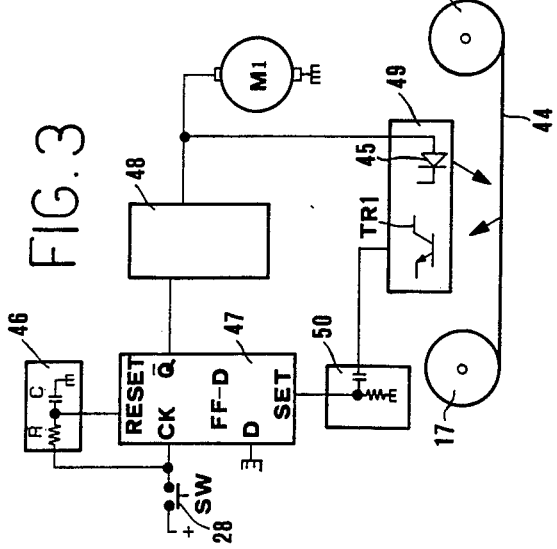
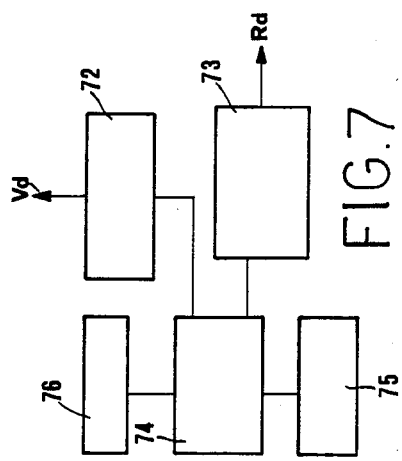

VIEWER FOR READING AND/OR DISPLAYING INFORMATION RECORDED ON WRITTEN OR PRINTED TAPE

BACKGROUND OF THE INVENTION

This invention relates to a viewer for reading and/or displaying information recorded on written or printed type.

In order to gain access and read information, such as technical data, graphs, drawings, illustrations, didactic texts, catalogs, fiction material or else, as written, printed or reproduced on an elongate web of rolled paper, the need is felt for a viewer which can support and progressively unfold the web to suit its reader's requirements.

SUMMARY OF THE INVENTION

It is an object of this invention to provide a viewer which can satisfactorily meet the above requirement.

Another object of the invention is to make the operation of said viewer automatic and adapted to provide for both the unwinding and rewinding of the web tape.

A further object of this invention is to arrange for said viewer to allow the tape to be unwound stepwise, so that the tape may be read intermittently similarly to the pages of a book.

An additional object of this invention is to arrange for said viewer to lend itself for use in combination with a magnetic tape recorder, e.g. for utilization as a didatic aid with audiovisual features.

It is still another object of the invention to provide such a viewer, which enables the user to mark and/or store certain items of information carried on the written or printed type for retrieval and prompt singling out after they have been read.

A not unimportant object of the invention is to provide such a viewer, which is reliable in operation, easy and convenient to operate, and of limited manufacturing cost.

According to the invention there is provided a viewer for reading and/or displaying information recorded on written or printed tape including a housing structure, two seats arranged to accommodate two rotatable reels, the first whereof has a written or printed web tape wound thereon, the other reel being adapted to rewind the tape as it is unwound from the first reel, and a magnifying lens arranged such as to sight the unwound tape portion between the two reels, and is characterized in that it further comprises motor means for driving said two reels, a motor means driving circuitry for controlling the forward and reverse feeds of said tape on said reels, and readout means adapted to detect control references provided on said tape.

BRIEF DESCRIPTION OF THE DRAWINGS

Further aspects and advantages of this invention will be apparent from the following detailed description of some preferred, though not limiting, embodiments thereof, given herein by way of example only with reference to the accompanying drawings, in which:

FIG. 1 is a schematical perspective view of a viewer according to the invention;

FIG. 3 shows a fragmentary block diagram of the drive circuit for tape forward feeding;

FIG. 4 is a detail wiring diagram of the drive circuit of FIG. 3;

FIG. 5 schematically illustrates the interlock connection of a magnetic tape recorder to a viewer according to the invention;

FIG. 6 is a block diagram of the recorder to viewer connection of FIG. 5;

FIG. 7 is a block diagram of an intelligent terminal interface between the recorder and viewer;

FIG. 8 schematically illustrates the terminal connection between the viewer and recorder; and FIG. 9 shows a portion of the tape provided with reference indicia along one edge.

DESCRIPTION OF THE PREFERRED EMBODIMENTS

Figure 2:
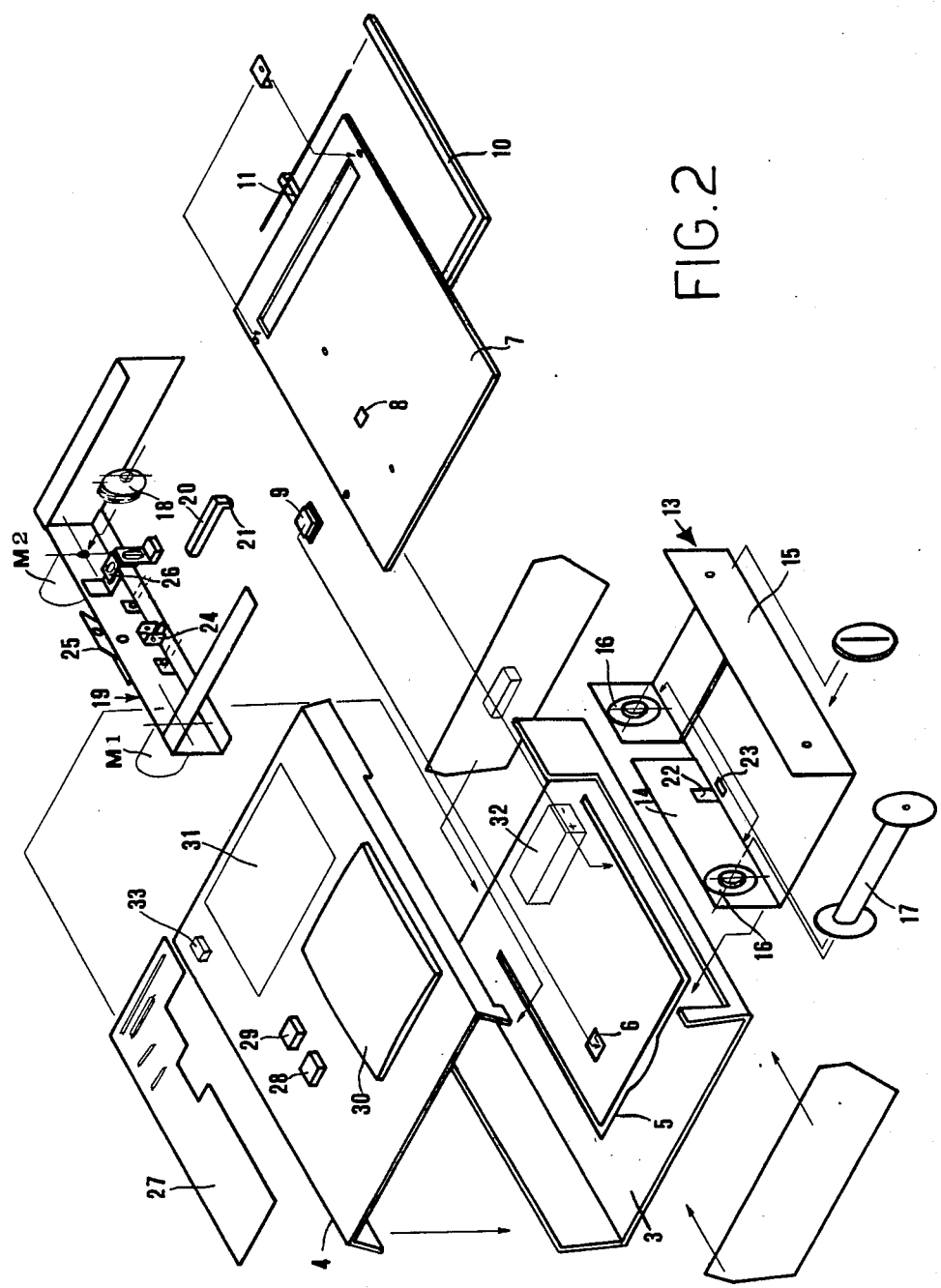
FIG. 2 is a schematical exploded view of the viewer of FIG. 1.

With reference first to FIGS. 1 and 2, a viewer 1 comprises a box-like housing 2 which has a bottom portion 3 and cover portion 4. The bottom wall 3 is spanned by a U-like slit 5, as well as by an aperture 6. Arranged for fastening to the bottom wall 3, is a plate or spacer 7 having an opening 8, which, in use, will be aligned with the aperture 6 for slidably accommodating a pushbutton 9 therethrough. The slit 5 is closed on the inside by the plate 7 and forms a seat for accommodating a U-like support 10 having its free ends pivoted to one or more tabs 11 made rigid with the plate 7, e.g. against a bias spring (not shown).

The box-like body 2 has on one side an opening 12 wherethrough a moving element 13 can be withdrawn drawer-fashion which comprises a bracket with two lateral surfaces 14 and 15 and having two seats 16 for removably accommodating a respective reel or spool 17, which is accordingly supported at its ends. Thus, between the two reels 17, a paper web tape can be wound/unwound which carries the information items or text to be read on the viewer 1.

Each seat 16, at the side 14 of the bracket, is arranged to engage and disengage, e.g. through a coupling assembly 18, with/from the driveshaft of a respective electric motor M1,M2. The electric motors M1,M2 are mounted on a support 19 located close behind the wall of the box-like body 2 which lies opposite the opening 12. To the support 19, there is pivoted with one end, a catch lever 20 having its other end provided with a detent tooth 21. The lever 20 is arranged such as to extend toward the interior of the housing 2 above the button 9 slidable through the openings 6 and 8 until, through an aperture or opening 22 in the wall 14, it engages with a slit 23 formed on the bottom of the bracket or drawer 13.

On either side of the support 24 of pivotal engagement for the lever 20, there are provided two springs (not shown) for the drawer 13 to pop out once it has been released from the lever 20. The support 19 also includes a lug 25 intended for supporting a light bulb (not shown in FIG. 2), as well as mounting brackets 26 for a printed circuit panel 27.

The cover portion 4 of the box-like body 2 has two holes 28 and 29 therein, for two pushbuttons included in the printed circuit of the underlying panel 27, and a magnifying lens 30 so arranged between the two seats 14 as to be focussed on the tape being unwound from one of the reels 17 and taken up on the other.

The cover 4 also comprises a slotted and finned area 31 for removing any heat generated within the box-like body 2 by the batteries located in a container 32 and bulbs(s) carried on the lug 26. Also provided on the viewer 1, is a three-way main switch (indicated at 42 in FIG. 3 and made accessible from the outside through a hole 33 in the cover portion 4), namely a switch having an off position, a second position for supplying the electronic drive circuit for the motors M1 and M2, and a third position for supplying, in addition to the electronic circuit, also the bulb(s) 43 carried on the lug 26.

A suitable electronic drive circuit is illustrated in block form in FIG. 3, and more in detail in FIG. 4. The entire electronic circuitry may be powered with four re-chargeable batteries 40, e.g. 1.2 Volt ones, and/or an external 6 Volt D.C. feeder 41. The external feeder not only supplies the viewer circuitry, it can be also arranged so as to recharge the batteries 40. The external feeder 41, in turn, can be connected to the electric power supply.

The tape 44 wound around the reels or spools 17, additionally to having written printed or represented thereon information or texts to be read, also carries indicia as required for correct operation of the viewer. Such indicia may be of various types, and in all cases in suitable form for electronic reading, such as in the magnetic or optical forms. By way of example, reference will be made hereinafter only to indicia adapted to reflect light from a specially provided source 45, e.g. a light-emitting diode. Said indicia may comprise black "bars" or lines, printed simultaneously with the text along one edge of the tape 44, and constitute information items for the viewer.

According to a first embodiment of the invention, bars are preset to mark the beginning of a passage or "page", and thus control signals can be supplied to the viewer and the tape 44 be forward and/or reverse fed stepwise through distances which correspond to the pages of a traditional book.

Briefly, making initial reference to the block diagram of FIG. 3, which depicts one half relating to the motor M1, the other half being perfectly symmetrical, it will be noted how said diagram includes the pushbutton 28, an R-C unit 46 connected to reset a D-type flip-flop 47, a power circuit or driver 48 for driving the motor M1, a reader group 49 which includes a light source 45, and a derivative net 50 having its input connected to the output of the reader group and its output arranged to set the flip-flop 47.

When the electronic circuit is turned on through the switch 42, the flip-flop assumes its set condition, i.e. with its output $\overline{Q}$ at a low level, thereby the driver 48 does not control the motor M1. Since the flip-flop 47 is responsive to the rise front of the clock signal CK upon turning off the pushbutton switch 28, its output $\overline{Q}$ will be switched to a high level, so that the driver 48 is enabled and the motor M1 caused to start.

Simultaneously therewith, the reader 49 is also turned on, and thus the diode 45 will emit light which is directed to impinge on the tape 44 and be reflected therefrom to a phototransistor TR1. Each time that on the tape 44 running under the reader 49, near the text, there appears an indexing mark (black bar), the light from the diode 45 is unreflected. Thus, the phototransistor TR1 goes off, and through the derivative net 50, supplies a setting pulse to the flip-flop 47, which will stop the motor M1. Since the black bars are provided at the beginning of each page, the tape or "roll book" will be advanced page by page or stepwise.

It may be seen from the circuit of FIG. 3 that there also exists the possibility of feeding the tape 44 continuously at a fast rate. For this purpose, it will be sufficient to hold the advance pushbutton 28 depressed for an equal or longer time duration than the time constant preset by the R-C unit 46 (e.g. one second) for the flip-flop 47 to be switched into its reset state. Then the driver 48 is enabled continuously and is unaffected by the set pulses generated by the appearance of the black bars on the tape. The tape 44 will continue to move forward, as long as the pushbutton 28 is held depressed, whereas as the pushbutton is released, it stops at the beginning of the next page (bar). The same considerations apply, of course, for the reverse button 29 controlling the motor M2.

For power saving reasons, it is advantageous to arrange for the reader 49 to be turned off when the motors M1 and M2 are inoperative.

All this is shown more in detail in the complete circuit of FIG. 4. Upon turning on the viewer 1, by operation of the switch 42, and in the rest condition (i.e. with both motors M1 and M2 inoperative), the situation is as follows. The integrated circuit 47 is in its set state, thereby its outputs $\overline{Q}$ (pins 2 and 12) are low. Accordingly, the transistors TR2, TR3, TR4 and TR5 are OFF, that is, the motors M1 and M2 are turned off. Also disabled are the transistors TR6 and TR7, so that not even the reader 49 is on.

Upon depressing either of pushbuttons 28, 29, to the clock input (pin 3 or pin 11) of the integrated circuit 47 there is applied a high signal level, and since the input D (pin 5 or pin 9) is low, the flip-flop 47 will switch its output Q (1 or 13) to a low level and output $\overline{Q}$ to a high.

To the output $\overline{Q}$, there is connected a respective drive circuit 48 (which comprises the transistors TR2, TR3 and TR4, TR5) for the motors M1 and M2. Therefore, if $\overline{Q}$ is at its high level, the two transistors TR2, TR3 or TR4, TR5 will become conductive and drive either of motors M1,M2. At the same time, either the transistor TR2 or transistor TR4 brings into play the drive circuit of the reader 49, which circuit comprises the transistors TR6 and TR7 and merely constitutes a current generator powering the photodiode 45 only when either of motors M1,M2 is driven. To this aim, the bases of the transistors TR6 and TR7 are brought to a suitable voltage level thanks to the provision of a respective diode, D1 and D2. Diodes D3 and D4 are instead provided on the collectors of the transistors TR3 and TR5 for current to recirculate when the motor is turned off.

The light emitted by the photodiode 45 is directed onto the tape 44 and received by reflection on the phototranisistor TR1. As the light is reflected (white paper of the tape 44), the transistor TR9 is on and a low level appears at its output. When the light beam from the photodiode is not reflected (appearance of a black line on the tape 44), the phototransistor TR1 goes OFF; as the transistor TR9 whose output is brought to a high level. The transition from the low to the high level of the transistor TR9 is supplied to the input SET of the integrated circuit 47 (pin 6 or pin 8), thereby the integrated circuit is set. Consequently, the output $\overline{Q}$ (pin 2 and 12) is reverted to the low level and disables the drive circuit 48 of the respective motor M1,M2, which is thus forced to stop.

In order to stop as quickly as possible the motors M1,M2, at the time when the output $\overline{Q}$ of the integrated 47 is switched to the low level to stop the motor running at the time, a positive pulse is supplied to the drive circuit of the other motor, by utilizing the positive-going transition of the output Q and a resistor-capacitor group 55,56 or 57, 58. The transistor TR8 which is normally OFF, is only brought into play when the running motor is blocked by a reason whatever, that is when the effort applied involves a higher current absorption than a preset threshold value. In this case, the transistor TR8 will set the integrated circuit 47, which in turn will cut off the transistor that feeds the motor, thus restoring the whole circuit to the inoperative condition. It will be noted, therefore, that the transistor TR8, along with the resistor 59 and capacitor 60 which are parallel connected between its base and emitter, constitutes a safety device for protecting the motors M1 and M2 and limiting the power supply to the motors.

The transistors TR10 and TR11 have the function of partly switching off the lamp 43 with either motor running to avoid current absorption peaks which could reflect in an excessive power consumption or adversely affect the proper operation of the feeder. The transistors TR10 and TR11 are preceded by a group of diodes D5, D6 and D7, which constitute a logic AND unit, thereby it will be sufficient that either of inputs B or C be at a low level for the base of the transistor TR10 to also be at a low, so that both transitors TR10 and TR11 in the OFF condition. In that case, the lamp 43 is fed with a current whose intensity depends on the value of the resistor 59.

FIGS. 5 and 6 show a variation or optional application of the viewer 1 of this invention, that is its coupling to a tape or disk recorder 61 on which a sound has been previously recorded which corresponds (e.g. for didactic purposes) to the various "pages" on the tape or book 44 in the viewer. For the operative connection of the viewer 1 to the recorder 61, an interface unit 62 should be provided which would comprise drive circuitry simulating the actuation of the recorder pushbuttons.

Such a circuitry is illustrated by the block diagram of FIG. 6. On the interface 62, there are two pushbutton switches 63 and 64 for respectively controlling the forward and reverse movements of the magnetic tape or disk of the recorder 61. On the recorder, there are established contacts Rd1 for normal playing forward, Rd2 for fast forward, and Rd3 for fast reverse or rewind. The contacts Rd1, Rd2 and Rd3 are controlled by respective relays Rl1, Rl2 and Rl3, located in the interface. The relay Rl1 is driven by a driver unit 65 for fast forward, while the relay Rl3 is controlled by a unit 66 controlling the fast reverse or rewind movement.

From the recorder 61 the sound signal is picked up over the line S and passed to a processing unit 67 to recognize both the end-of-page information and perform the automatic forward movement, where required, page-by-page, of the tape 44 through the viewer, which is then driven directly by the recorder. During the audio recording on the recorder, between one portion corresponding to one page on the tape 44 of the viewer and the beginning of the next portion (relating to the following page) it is necessary to record a suitable signal intended for processing by the interface 67, e.g. in the form of a pulse modulated by a frequency outside the audible range.

The interface 62 is connected to the viewer 1 through the lines Bd1 and Bd2.

With this arrangement, the viewer 1 operates as follows. It is assumed that the initial condition contemplates both the tape or book 44 within the viewer and the tape or disk within the recorder in their starting positions. For each one page forward step of the viewer, the tape in the recorder is started automatically, lets the sound be heard and stops, also automatically, at the end of the text relating to that page. The synchronization of the viewer and recorder is maintained by the end-of-page signals recorded in the recorder and processed by the unit 67. Advantageously, such signals may also concern the fast forward movement, as well as the tape rewind movement.

The variation just described is expected to find its particular and advantageous application especially to the children didactic sector, and all those applications where video-audio synchronization is bound to facilitate reading and/or learning.

FIGS. 7, 8 and 9 show a variation wherein the interface 62 enables a more sophisticated use of both the viewer 1 and recorder 61, e.g. to produce a powerful didactic aid. In this case, the book or tape 44 should include, additionally to the printed, written or illustrated text, a whole series of informational indicia, e.g. in the form of black strips or bars (not shown), printed or otherwise appended, for example, along one edge of the tape 44. The bars are arranged in accordance with a predetermined code to provide information, for instance on the page numbering, the numbers of the various chapters, the numbers of figures, etc. These same information items should also be contained in the tape or disk of the recorder 61 in order to ensure the video-audio synchronization at any given time. The block diagram of the interface 62 in FIG. 8 is shown in FIG. 7. As may be noted, the diagram of FIG. 7 comprises an interface 72 for the viewer and an interface 73 for the recorder. The two interfaces 72 and 73 are connected to a microcomputer 74 which can be acceded to through a keyboard 75. To the computer 74, a digital or alphanumeric display 76 is also connected.

The interface 70, more appropriately termed intelligent terminal, can read both information on the tape 44 of the viewer and information from the recorder, as well as keep the recorder 61 in step with the viewer 1. The display 76 and keyboard 75 enable the terminal to suitably converse with the user. As an example, it will be possible to automatically retrieve a page, chapter, figure, or drawing, etc. previously entered through the keyboard 75. In any case, both the book formed by the tape 44 and the tape or disk in the recorder will stop at the desired position.

On the display 76, it is possible to visually observe the current page, chapter, or any other reference contained in the tape 44. Naturally, all these functions are efficiently performed by the microcomputer 74, which enables the adoptions of various forms of automation. Thus, as an example, a task or test may be automatically corrected. The tape 44 would then contain the text of the task or exercise to be performed, or of the test to be implemented in the form of a questionnaire, and would also include a range of possible answers from which to pick up the one regarded as appropriate by indicating a reference numeral. The tape 44 obviously would not contain the correct answer, which is instead contained in the tape or disk of the recorder 61. That answer can only be read by the terminal 70. Thus, when the user answers a question, the terminal compares each answer provided by him/her with the correct one, previously recorded, and can thus automatically correct the exercise or test.

It is thought that by utilizing a viewer 1 associated with a recorder 61 through the terminal 70, the teaching, for example, of mathematics to children can be considerably facilitated.

The sound recorder in the recorder 61 may be either the one submitted in copy with a respective tape 44 in the viewer 1, or be modified by the user to insert personal comments to the page he/she is reading.

Advantageously, the terminal 70, at the discretion of the user, may be converted into a desk calculator, clock or stopwatch.

It should be noted that by providing a terminal 70, the reader or user is given the faculty of entering, in a suitable memory of the microcomputer 74, a whole series of information items he/she regards as interesting, e.g. the underlining of passages of the text on the tape 44, subdivision of the text into subjects, attaching of particular codes for later use as the book is being re-read, changing the order of the pages in which the book is to be read, etc. Such information may be entered at each page of the book written on the tape 44. In practice, for each page of the book there will be a storage area containing the reading procedure proposed to the reader or established by the reader himself/herself. Thus, each book would include a tape 44 and a memory. Said memory should retain the data even in the absence of power supply, and be able to be changed at will by the reader, while always retaining the latest data entered. This is made possible by the utilization, for example, of a memory of the EAROM (Electrically Alterable Read-Only Memory) type.

Therefore, each book or tape 44 will require one or more EAROM memories. Upon purchasing the book, the EAROM memory would also be supplied to include a standard book reading procedure. A few examples of applications for the arrangement of FIG. 8 include: underlining of phrases, reading by subjects, reading of codes, and non-sequential reading of the book or text. For the underlining of phrases in the book comprised of the tape 44, it will be possible to provide a plurality of light dots 71, for example in the form of light-emitting diodes (LED's) (not shown), which are fastened mechanically to the plate 7 and located laterally with respect to the tape 44. A good compromise could be that of selecting eight light dots, thus dividing each page into eight parts, as shown in FIG. 9. When a dot so pre-arranged is activated, that would mean that the line(s) brought into alignment therewith is (are) to be regarded as underlined. It is possible to mark in this way as many points as desired, at the reader's discretion. The book would only be re-read ultimately where underlined, thus affording the advantages of summarizing and time saving.

Moreover, the book may be divided while it is being read into any number of subjects. Further, for each page or even each of the eight spaces into which a page is subdivided, the kind of subject being read may be entered in the EAROM memory. This would apply to any of the various kinds of subjects selected. Ultimately, it will be possible to read the book for just a single subject, as selected by the reader. In that case, the tape 44 would be allowed to run and then stopped at the selected subject, where a luminous dot will indicate the precise location of the desired subject on the page.

If the book contains codes and any particular code is to be retrieved, one can locate that code by entering the number of the code on the keyboard 75. Also in this case, a memory corresponding to the book being used would be required. This embodiment would also allow the entering, during the reading phase, of all the codes which must be marked on each individual page, or those previously marked to be changed, thereby such codes can be retrieved in an automatic manner.

If each page is made to correspond to a suitable code, then it would be possible to subsequently glance over the book according to the numerical order of the codes rather than in a sequential order. This may be useful, for example, to a relator who wishes to report on a book, review, or else. The book on the tape 44 would only stop, controllably, where the relator has previously marked a code and in accordance with an order of progress that the relator him/herself has established.

The invention as described is susceptible to many modifications and variations, all of which are to be regarded as included in the scope of the instant inventive concept. Thus, for example, in the diagram of FIG. 4, the forward/reverse control for the motors M1 and M2 may be provided externally of the viewer 1. To this end, a connecting unit, e.g. a five-pole one, would be provided on the lateral portion of the viewer 1, whereto a remote control would be connected separately.

The materials and dimensions may vary to suit individual requirements.

I claim:

1. A viewer for reading and/or displaying information recorded on written or printed tape, comprising:
    a housing having an opening;
    a magnifying lens in said opening;
    two spaced apart reels arranged in said housing at two opposed sides of said opening;
    a tape having marks thereof for winding around said reels;
    a pair of motor means connected to said reels;
    a first forward push bottom and a second rewind push botton for selectively actuating said motor means;
    a main switch;
    a control circuit in said housing for controlling the actuation of said motor means, said control circuit having a forward section and a rewind section, each said section comprising memory means having two inputs and at least one output, a first input of said memory means being connected with either said push-botton, said memory means feeding at said first output thereof a first electric signal of a first logical level upon actuation of said memory means by said push-botton. drive means connected to said first output for feeding said motor means upon reception of said first signal from said memory means, said control circuit further comprising reader means arranged in said housing on the path of said tape between said two reels for detecting said marks, said reader means having an output connected to a second input of said memory means of each said section and generating a second electric signal upon detection of said marks on said tape and causing said first electric signal at said output of said memory means to switch from said first logical level to a second logical level for switching off and stopping said motor means.

2. A viewer according to claim 1, wherein said reader comprises a photodiode projecting light onto said tape and a phototransistor for receiving light from said photodiode as reflected by said tape, and said marks on the tape comprise non-reflecting bars on a reflecting surface.

3. A viewer according to claim 1, wherein each said section further comprises a delay circuit having a preset time constant connected to said push botton and a further reset input of said memory means for keeping said memory means in its reset state with said first electric signal in said first logic level when said push-botton is held pressed for a time longer than said time constant.

4. A viewer according to claim 1, wherein said drive means comprises a first and a second transistor having emitters, bases and collectors, said base of said first transistor being connected to said output of said memory means, said emitter of said first transistor being connected to ground and said collector of said first transistor being connected, through a diode, to said base of said second transistor, said collector of said second transistor being connected to said motor means.

5. A viewer according to claim 1, wherein said reader comprises a photodiode projecting light onto said tape and a phototransistor for receiving light from said photodiode as reflected by said tape, and said control circuit further comprises a constant current feeder section for said photodiode, said section having two transistors having emitters, bases and collectors, said emitters of said transistors being connected together and to a constant supply voltage, said collectors of said transistors being connected together and to an anode of said photodiode, and said bases of said tranors being connected to either of said drive means.

6. A viewer according to claim 1, further comprising a motor means shutdown circuit including a transistor having its base connected to the output of said drive means and its collector connected to said second input of said memory means.

7. A viewer according to claim 1, wherein said control circuit further comprises a lamp feeding circuit including two transistors and diodes connected to a further output of said memory means feeding a further electric signal of logical level opposed to said first signal to thereby shut off lamp means when either motor means is fed and running.

8. A viewer according to claim 1, further comprising an interface unit for connection to a recorder, said interface comprising an acoustical signal processing unit.

9. A viewer according to claim 1, further comprising signalling means for lightening specific passages on said tape, said signalling means comprising a plurality of light-emitting diodes arranged in said housing structure near a delimiting side of said aperture for lighting up said specific passages on said tape.

10. A viewer according to claim 1, wherein said two reels with said tape are accommodated in a movable element in the form of a drawer extractable from said housing.

* * * * *